(12) United States Patent
Kadowaki

(10) Patent No.: US 11,977,366 B2
(45) Date of Patent: May 7, 2024

(54) ASSIST DEVICE, DISPLAY DEVICE, ASSIST METHOD, AND ASSIST PROGRAM

(71) Applicant: SUMITOMO HEAVY INDUSTRIES, LTD., Tokyo (JP)

(72) Inventor: Masanori Kadowaki, Kanagawa (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 105 days.

(21) Appl. No.: 17/477,064

(22) Filed: Sep. 16, 2021

(65) Prior Publication Data

US 2022/0004165 A1  Jan. 6, 2022

Related U.S. Application Data

(63) Continuation of application No. PCT/JP2020/011488, filed on Mar. 16, 2020.

(30) Foreign Application Priority Data

Mar. 19, 2019 (JP) ................. 2019-051260

(51) Int. Cl.
*G05B 19/418* (2006.01)

(52) U.S. Cl.
CPC .. *G05B 19/418* (2013.01); *G05B 2219/34465* (2013.01)

(58) Field of Classification Search
CPC ........ G05B 19/418; G05B 2219/34465; G05B 23/0272; G05B 11/00; G05B 9/00; G05B 2219/00; G05B 2219/50; G05B 2219/10; G05B 2219/20; G05B 2219/31
See application file for complete search history.

(56) References Cited

U.S. PATENT DOCUMENTS

| 10,013,634 | B2 | 7/2018 | Sharma et al. |
| 2008/0082194 | A1 | 4/2008 | Samardzija et al. |
| 2009/0217194 | A1* | 8/2009 | Martin .................. G16Z 99/00 715/783 |
| 2010/0156654 | A1* | 6/2010 | Bullemer ............ G05B 23/0272 340/691.6 |
| 2011/0061013 | A1* | 3/2011 | Bilicki ............. G06Q 10/06393 715/771 |

(Continued)

FOREIGN PATENT DOCUMENTS

| JP | 2000-010622 A | 1/2000 |
| JP | 2001-067117 A | 3/2001 |

(Continued)

OTHER PUBLICATIONS

International Search Report issued in Application No. PCT/JP2020/011488, dated Jun. 9, 2020.

(Continued)

*Primary Examiner* — Kidest Bahta
(74) *Attorney, Agent, or Firm* — Michael Best & Friedrich LLP

(57) ABSTRACT

An assist device is for grasping the operating status of a plant and includes a data acquisition unit that acquires process data for the plant, a summarization unit that sum- (Continued)

marizes the dimensionality of the process data acquired by the data acquisition unit, and a display unit that displays the summarized data summarized by the summarization unit.

11 Claims, 6 Drawing Sheets

(56) References Cited

U.S. PATENT DOCUMENTS

| | | | | |
|---|---|---|---|---|
| 2011/0313969 | A1* | 12/2011 | Ramu | G06F 16/254 |
| | | | | 707/602 |
| 2013/0073260 | A1 | 3/2013 | Maeda et al. | |
| 2014/0108985 | A1* | 4/2014 | Scott | G06F 3/0484 |
| | | | | 715/771 |
| 2015/0094988 | A1* | 4/2015 | Schumacher | G05B 17/02 |
| | | | | 702/188 |
| 2015/0143268 | A1* | 5/2015 | Retlich | H04L 41/22 |
| | | | | 715/763 |
| 2016/0132048 | A1* | 5/2016 | Kambe | G05B 19/418 |
| | | | | 700/87 |
| 2016/0283916 | A1 | 9/2016 | Iwata et al. | |
| 2017/0092021 | A1 | 3/2017 | Nielsen et al. | |
| 2018/0196400 | A1 | 7/2018 | Kobayashi et al. | |

FOREIGN PATENT DOCUMENTS

| | | | |
|---|---|---|---|
| JP | 2003186534 A | * | 7/2003 |
| JP | 2010-128857 A | | 6/2010 |
| JP | 2011-113195 A | | 6/2011 |
| JP | 2011-227706 A | | 11/2011 |
| JP | 2015-087867 A | | 5/2015 |
| JP | 2017-117438 A | | 6/2017 |
| JP | 2018-112903 A | | 7/2018 |
| WO | WO-2014/119110 A1 | | 8/2014 |

OTHER PUBLICATIONS

Ritvikmath: "Basics of PCA (Principal Component Analysis): Data Science Concepts," YouTube, Sep. 10, 2019, XP055904316, Retrieved from the Internet: https://www.youtube.com/watch?v=pmG4k79DUol, retrieved on Mar. 18, 2022.

Search Report issued in European Application No. 20773293.4, dated Mar. 30, 2022.

* cited by examiner

ASSIST DEVICE, DISPLAY DEVICE, ASSIST METHOD, AND ASSIST PROGRAM

RELATED APPLICATIONS

The contents of Japanese Patent Application No. 2019-051260, and of International Patent Application No. PCT/JP2020/011488, on the basis of each of which priority benefits are claimed in an accompanying application data sheet, are in their entirety incorporated herein by reference.

BACKGROUND

Technical Field

A certain embodiment of the present invention relates to an assist device, a display device, an assist method, and an assist program for grasping the operating status of a plant.

Description of Related Art

Plant workers are usually required to multi-facedly grasp various parameters such as trend changes in time-series data of a plurality of indicators or sensors disposed on a physical map, and the interlocking between the sensors. Additionally, in the related art, as devices for assisting in grasping the operating status of a plant, for example, devices such as those in the related at are known. The related art describes that for each of a plurality of facilities of different types, index values indicating a maintenance priority are calculated using common scales. Additionally, the related art discloses assisting in the operation of a plant by calculating estimated values or predicted values from process data in the plant.

SUMMARY

According to an embodiment of the present invention, there is provided an assist device for grasping an operating status of a plant, including a data acquisition unit that acquires process data for the plant; a summarization unit that summarizes the dimensionality of the process data acquired by the data acquisition unit; and a display unit that displays the summarized data summarized by the summarization unit.

DETAILED DESCRIPTION

Figure 1:
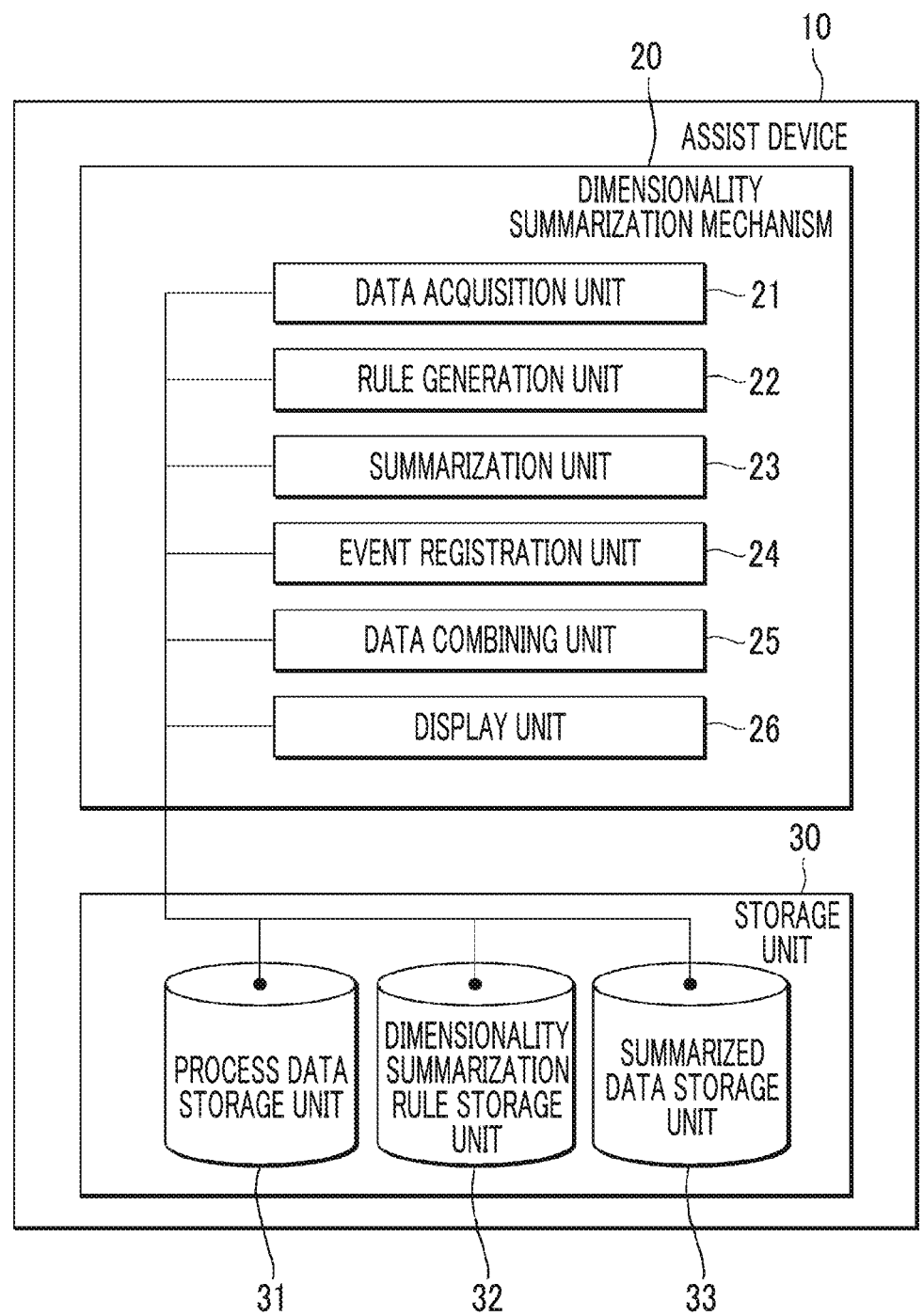
FIG. 1 is a view showing a configuration of an assist device 10 according to an embodiment of the present invention.

However, in the related art, the operating status of the plant can be grasped by multi-facedly understanding various parameters disposed on the physical map. Therefore, there is a case where an excessive burden is imposed on the worker, and it is difficult for an unskilled person to suitably grasp the operating status of the plant.

In this respect, the device of Patent Document 1 merely calculates the priority of maintenance, and it cannot be said that the device can sufficiently cope with grasping the operating status of the plant. Additionally, since the device of Patent Document 2 involves the calculation of the estimated values and predicted values, it is required to grasp the operating status of the plant with a simpler configuration.

It is desirable to provide an assist device, a display device, an assist method, and an assist program capable of easily grasping the operating status of a plant with a simple configuration.

According to the above embodiment, the dimensionality of the process data is summarized by the summarization unit, and the summarized data summarized by the summarization unit is displayed on the display unit. According to this, since the summarized data in which the dimensionality of the process data is summarized is displayed, for example, as compared with a case in which multidimensional process data is displayed, the operating status of the plant can be easily grasped without imposing an excessive burden on the worker. Additionally, since the display is based on the summarized data, for example, even an unskilled person can grasp the operating status of the plant. Moreover, since the summarized data in which the dimensionality of the process data is summarized is handled, it is possible to assist in grasping the operating status of the plant with a simple configuration.

Another embodiment of the present invention is a display device. This device is a display device for grasping an operating status of a plant. The display device displays summarized data in which dimensionality of process data for the plant is summarized; and past summarized data combined with a registered event related to the plant in a contrastable manner.

Yet another embodiment of the present invention is an assist method. An assist method for grasping an operating status of a plant. The assist method includes acquiring process data for the plant by a data acquisition unit; summarizing dimensionality of the process data acquired by the data acquisition unit by a summarization unit; and displaying the summarized data summarized by the summarization unit by a display unit.

Still another embodiment of the present invention is an assist program. This program is an assist program to be executed by a computer to grasp an operating status of a plant. The program causes the computer to execute acquiring process data for the plant; summarizing dimensionality of the acquired process data; and displaying the summarized data.

Yet another embodiment of the present invention is a plant. This plant includes a data acquisition unit that acquires process data from a sensor provided in the plant and a control device that controls the plant; a summarization unit that summarizes dimensionality of the process data acquired by the data acquisition unit; and a display unit that displays the summarized data summarized by the summarization unit.

In addition, optional combinations of the above components and those obtained by substituting the components or expressions of the present invention with each other among methods, devices, systems, computer programs, data structures, recording media, and the like are also effective as embodiments of the present inventions.

According to the present invention, the operating status of the plant can be easily grasped with a simple configuration.

Hereinafter, the present invention will be described through an embodiment of the invention with reference to the drawings, but the following embodiment does not limit the invention according to the claims. Additionally, all combinations of features described in the embodiment are not limited to being essential to the solution of the invention. The same or equivalent components, members, and processing shown in the respective drawings will be designated by the same reference numerals, and the redundant descriptions thereof will be appropriately omitted.

Figure 2:
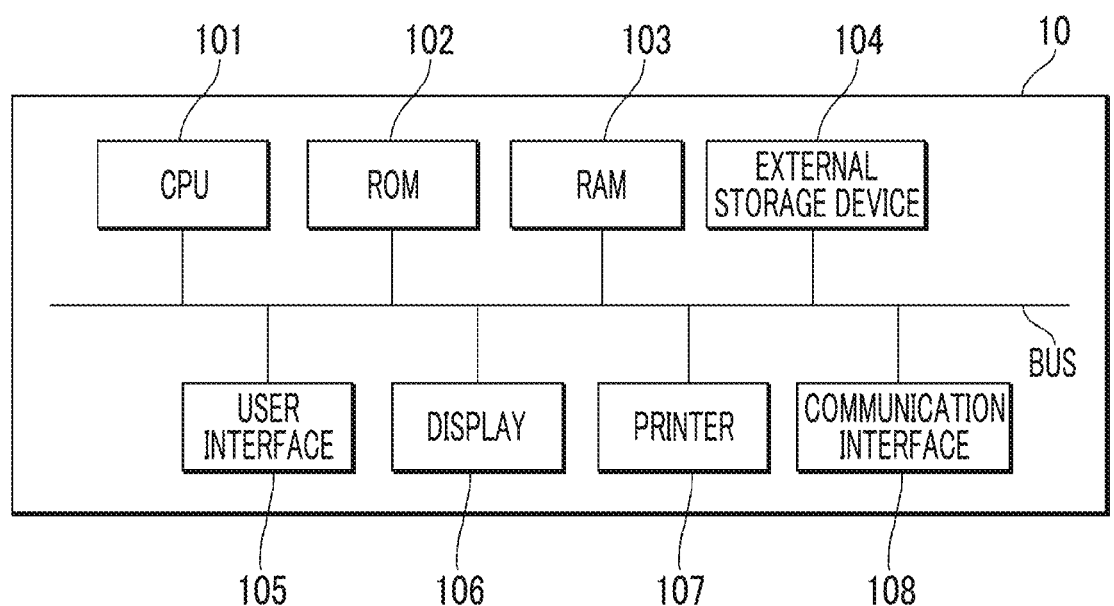
FIG. 2 is a view showing an example of a hardware configuration of the assist device 10.
Figure 3:
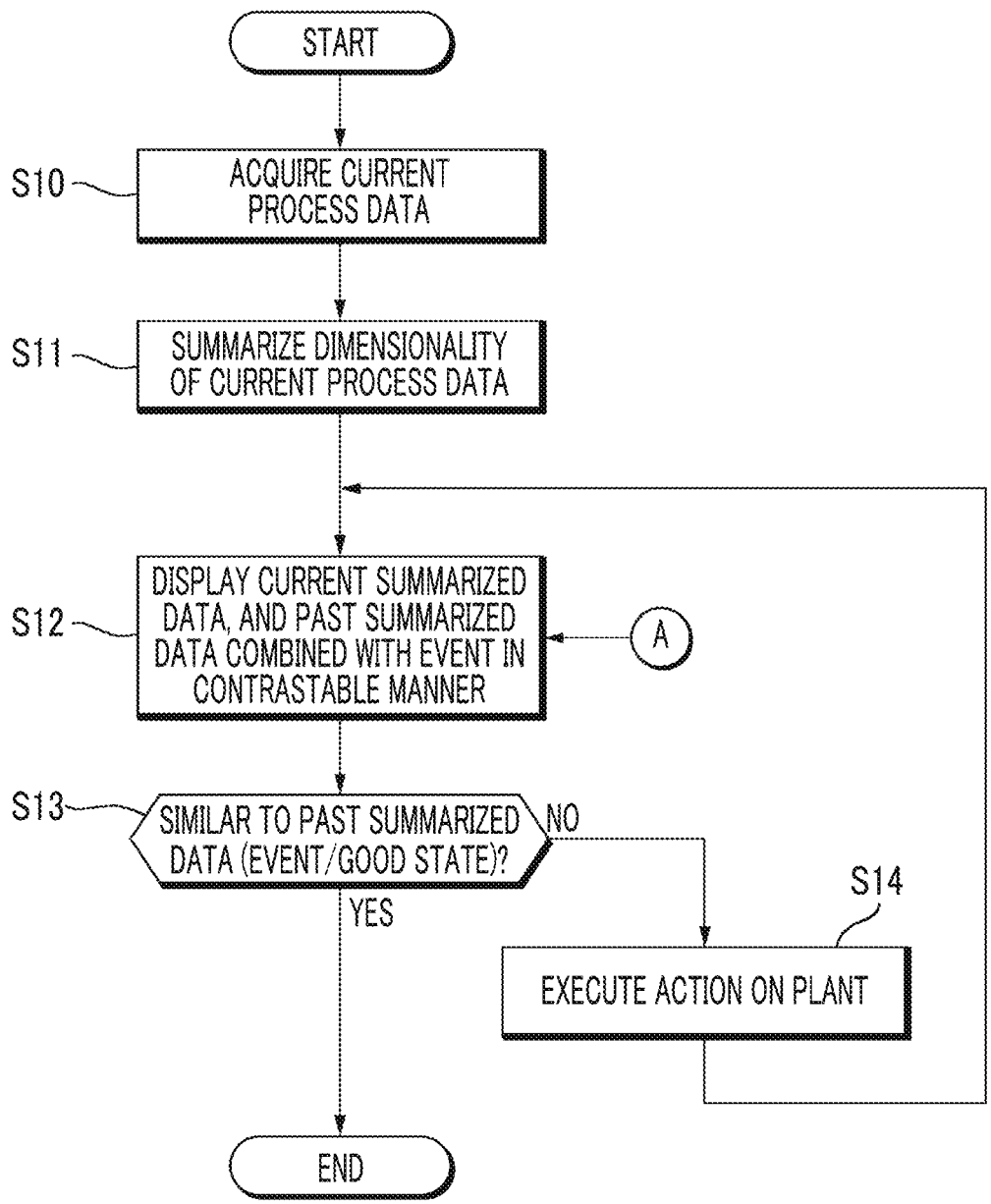
FIG. 3 is a flowchart showing an example of an assist method by the assist device 10.
Figure 4:
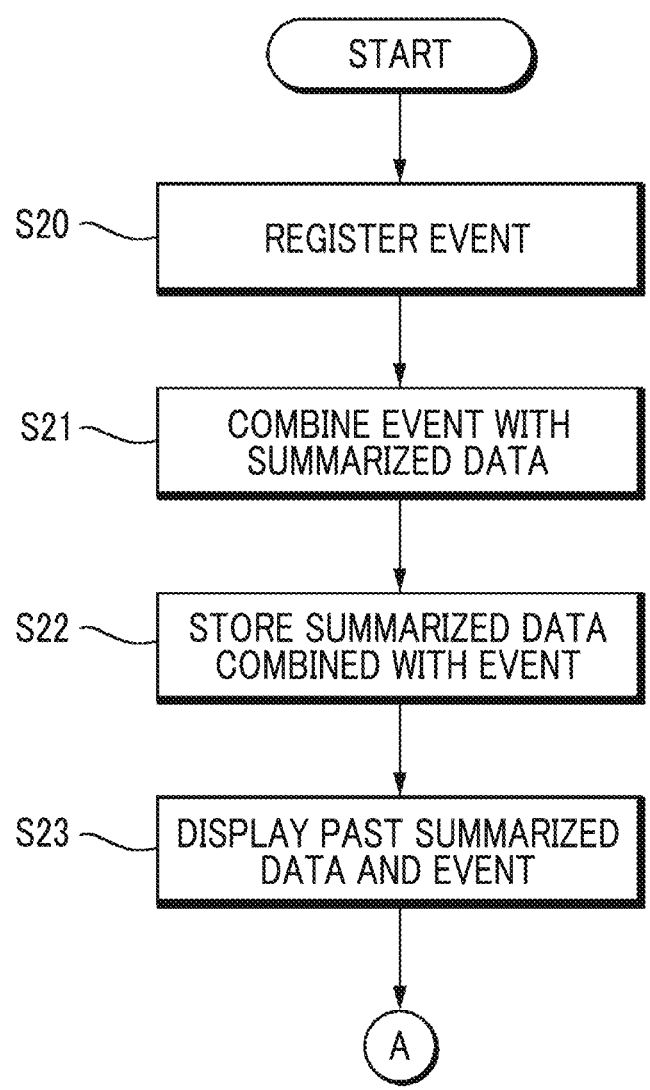
FIG. 4 is a flowchart showing the example of the assist method by the assist device 10.
Figure 5:
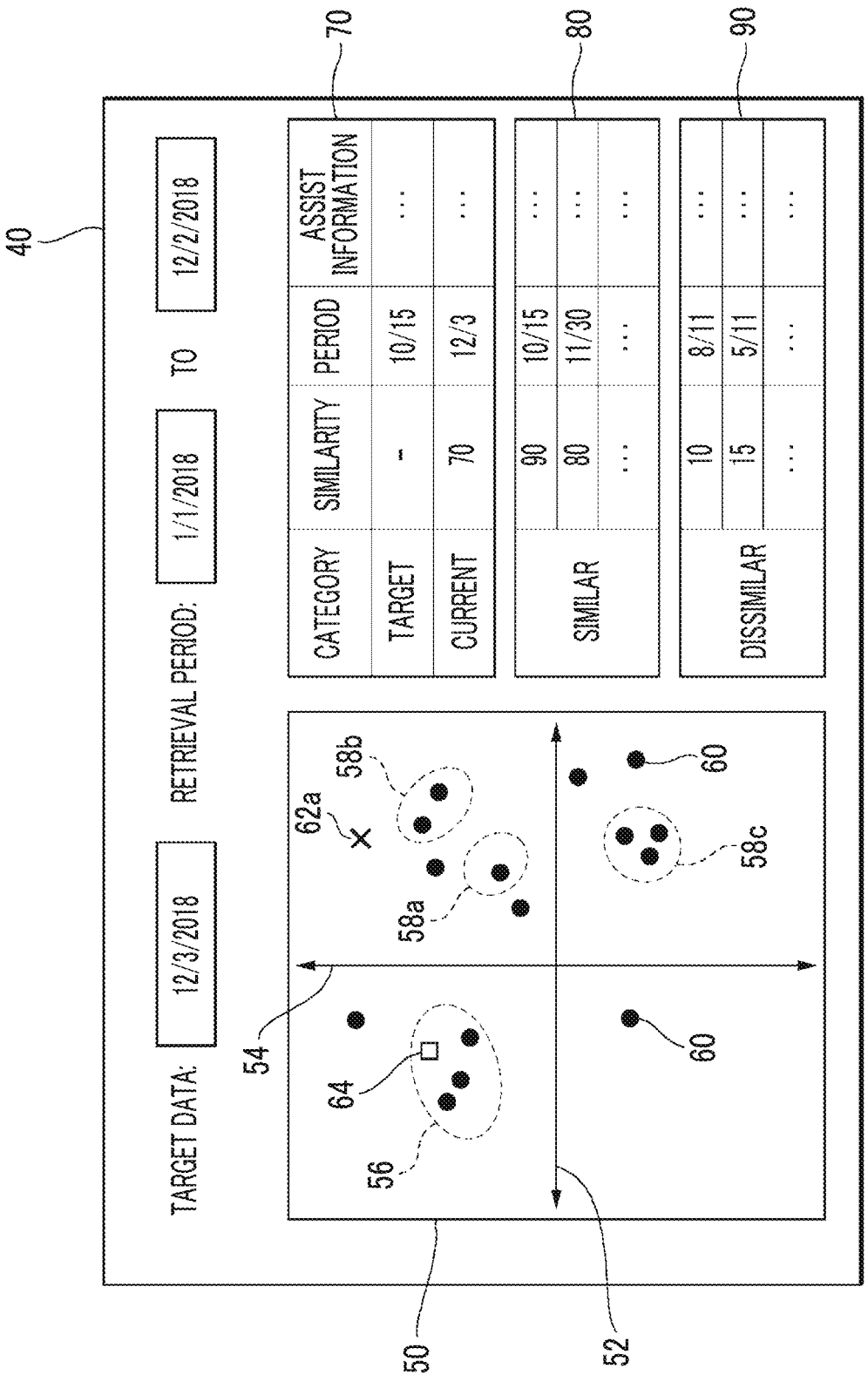
FIG. 5 is a view for explaining the assist method by the assist device 10.
Figure 6:
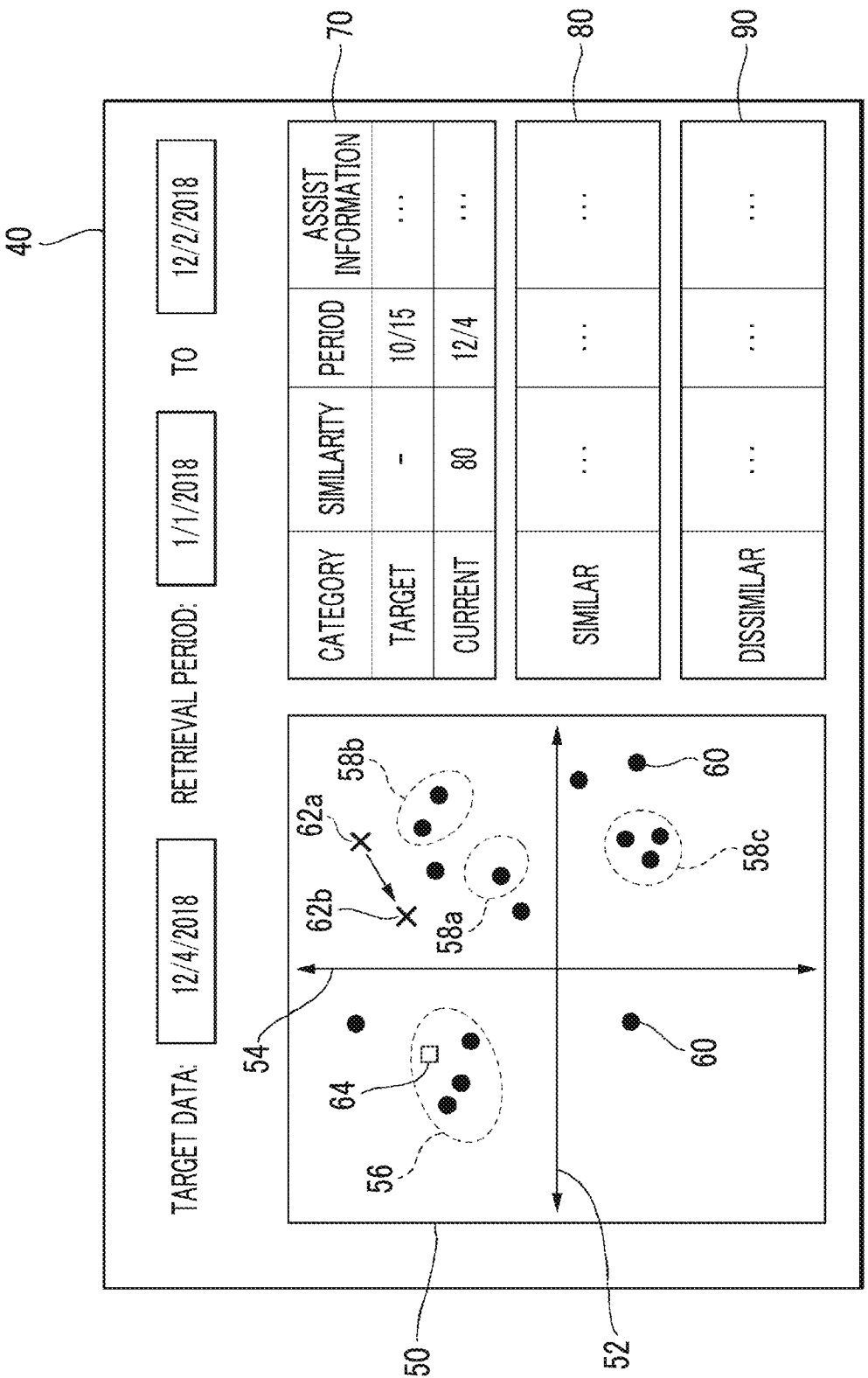
FIG. 6 is a view for explaining the assist method by the assist device 10.

FIGS. 1 to 6 are views for explaining an assist device and an assist method according to the embodiment of the present invention. Specifically, FIG. 1 is a view showing a configuration of an assist device 10 according to an embodiment of the present invention, and FIG. 2 is a view showing an example of a hardware configuration of the assist device 10. Additionally, FIGS. 3 and 4 are flowcharts showing an example of the assist method by the assist device 10, and FIGS. 5 and 6 are views for explaining the example of the assist method.

The assist device 10 is for grasping the operating status of a plant. Examples of the plant include power plants, incineration plants, chemical plants, or the like. The plant includes a processing device (not shown) that performs a predetermined processing (for example, power generation processing, incineration processing, chemical processing, or the like). Optional process data is used in the plant. The process data is, for example, data of process values such as temperature, pressure, air volume, concentration, or component. Specifically, the process values of the process data may include measured values detected by sensors installed in the plant and manipulated variables based on differences between set values and the measured values for points detected by the sensors. The process data obtained from the plant is multidimensional data in which hundreds or more types are present.

The assist device 10 includes a dimensionality summarization mechanism 20 and a storage unit 30. The dimensionality summarization mechanism 20 is connected to a plurality of sensors (not shown) provided in the plant and a control device (not shown) that controls the plant, and acquires the process data from the sensors and the control device, and summarize the acquired process data to display the summarized data. The storage unit 30 stores various data related to the plant and also stores various data calculated or acquired by the dimensionality summarization mechanism 20.

A predetermined program necessary for executing the assist method according to the present embodiment is pre-installed in the assist device 10, and FIG. 2 shows an example of the hardware configuration. Specifically, a general-purpose or dedicated computer including a CPU 101, a ROM 102, a RAM 103, an external storage device 104, a user interface 105, a display 106, a printer 107, and a communication interface 108 can be applied to the assist device 10. The CPU 101 performs a calculation on the basis of the information input from a worker by the user interface 105, outputs the calculation result to the display 106 or the printer 107, and while the worker recognizes the output, required information can be input to the assist device 10 by the user interface 105.

The assist device 10 may be one including a single computer or may be one including a plurality of computers distributed on a network. In the assist device 10, for example, the CPU can execute a predetermined program (a program that defines the assist method according to the present embodiment) stored in the above-described ROM, RAM, external storage device, or the like or downloaded via a communication network, thereby cause the assist device 10 to function as various functional blocks or various steps to be described below.

Hereinafter, various functional blocks of the dimensionality summarization mechanism 20 and the storage unit 30 in the assist device 10 will be described.

The dimensionality summarization mechanism 20 includes a data acquisition unit 21, a rule generation unit 22, a summarization unit 23, an event registration unit 24, a data combining unit 25, and a display unit 26. Additionally, the storage unit 30 includes a process data storage unit 31, a dimensionality summarization rule storage unit 32, and a summarized data storage unit 33.

The data acquisition unit 21 acquires the process data of the plant. The process data is, for example, data showing changes in process values over time. In this case, the process data may be continuous changes in process values at predetermined time intervals. The process data is the multidimensional data. The process data acquired by the data acquisition unit 21 is stored in the process data storage unit 31 together with the information on the timing of the plant.

The rule generation unit 22 generates a dimensionality summarization rule that summarizes the dimensionality of the process data into a smaller number of dimensions for the process data stored in the process data storage unit 31. The dimensionality summarization rule generated by the rule generation unit 22 is stored in the dimensionality summarization rule storage unit 32 together with the information on the timing of the plant.

An algorithm for summarizing dimensionality is not particularly limited, but for example, principal component analysis can be applied. In this case, the dimensionality summarization rule determines first to nth (n is an integer of 2 or more) principal components of the process data stored in the process data storage unit 31. The generation of the dimensionality summarization rule by the rule generation unit 22 may be regularly performed, or at the timing when the dimensionality summarization mechanism 20 dimensionally summarizes the process data in order to grasp the operating status of the plant, a dimensionality summarization rule may be generated (or updated) for the process data stored so far in the process data storage unit 31 each time. The number of principal components in the dimensionality summarization rule is not limited, but may be, for example, two of a first principal component and a second principal component, or three of first to third principal components. By reducing the number of principal components, the operating status of the plant can be more easily displayed.

The summarization unit 23 summarizes the dimensionality of the process data acquired by the data acquisition unit 21. For example, the summarization unit 23 summarizes the dimensionality of the process data on the basis of the dimensionality summarization rule generated by the rule generation unit 22. In this way, summarized data having a smaller number of dimensions than the process data is generated. The process data summarized by the summarization unit 23 is process data for a predetermined period for which the operating status of the plant is desired to grasp. For example, the summarization unit 23 may generate current summarized data from current process data. The summarized data generated in this way is stored in the summarized data storage unit 33. Additionally, the summarized data can be displayed in a coordinate system with each principal component as a coordinate axis. For example, two-dimensionally summarized data including the first principal component and the second principal component can be displayed in a two-dimensional coordinate system.

The event registration unit 24 registers an event related to the plant. The event registration unit 24 registers an event, for example, by receiving an input via the user interface 105 from the worker. The contents of the event vary depending on the operating status of the plant, and can be generally divided into either good or bad state for the operation of the plant. Specific contents of the event may include, for example, the test run (good state) of the plant, the run (good state) immediately after a periodic inspection, a failed state (bad state), an operation (bad state) in which the actual operation of the plant deviates from a set value, a state (bad state) when the plant is restarted, and the like. The event registration unit 24 may, for example, register an event in association with the good/bad information of the operating status of the plant. The good/bad information is not limited to a mark or the like indicating good or bad, and may be any information that allows the worker to recognize the contents, thereby grasping whether the information is good or bad for the operation of the plant. In addition, the event registered by the event registration unit 24 is not limited to one that belongs to either good or bad state for the operation of the plant and may belong to any other unknown state.

The data combining unit 25 combines the event registered by the event registration unit 24 with the summarized data summarized by the summarization unit 23. The summarized data combined with the event is stored in the summarized data storage unit 33. Additionally, the invention is not limited to an aspect in which all the summarized data summarized by the summarization unit 23 is combined with the event, and for example, only the summarized data at a predetermined timing may be combined with an event that has occurred at the predetermined timing.

The display unit 26 (an example of a display device) displays the summarized data summarized by the summarization unit 23. For example, when the summarized data is summarized in two dimensions including the first principal component and the second principal component, the summarized data can be displayed in the two-dimensional coordinate system by the display unit 26. Additionally, the display unit 26 can display the summarized data at a predetermined time point for grasping the operating status of the plant in a contrastable manner with past summarized data with respect to the time point. In this case, the past summarized data may be displayed together with the contents of an event (and good/bad information as necessary) combined with the past summarized data. Additionally, the display unit 26 may further display changes in the summarized data when an action is executed on the plant. The changes in the summarized data are performed, for example, by showing coordinate-based information before and after the action of the summarized data in the coordinate system.

In addition, the specific operations of the various configurations of the above-described dimensionality summarization mechanism 20 and storage unit 30 will be described in more detail in the assist method to be described below.

Hereinafter, an example of the operation using the assist device 10 will be described as the assist method according to the embodiment of the present invention while referring to FIGS. 3 to 6. FIG. 3 is an example of the overall assist method according to the present embodiment. FIG. 4 shows an example of a method of combining the event with the summarized data. Additionally, FIGS. 5 and 6 show an example of a display mode by the display unit 26 before and after executing an action on the plant.

In the following method, an example of a technique in which the current summarized data is contrasted with the past summarized data (good state during a test run), and the past summarized data that was in a good state is set as a target, and the plant is operated so as to approach the target will be described. In addition, an example in which principal component analysis is applied will be described as the algorithm for summarizing dimensionality.

In FIG. 3, first, the data acquisition unit 21 acquires the current process data of the plant (S10). The current process data acquired by the data acquisition unit 21 is stored in the process data storage unit 31. In addition to the current process data, past process data over a predetermined period is accumulated in the process data storage unit 31. The acquisition of the process data by the data acquisition unit 21 may be performed by receiving an input from the worker via the user interface 105.

Next, the summarization unit 23 summarizes the dimensionality of the current process data (S11). Specifically, the summarization unit 23 dimensionally summarizes the current process data read from the process data storage unit 31 on the basis of the dimensionality summarization rule generated by the rule generation unit 22, thereby generating the current summarized data. The dimensionality summarization rule is generated for the current and past process data stored in the process data storage unit 31, and includes, for example, determining the contents of each principal component. Then, the summarization unit 23 calculates the principal component score of each principal component determined by the rule generation unit 22 and generates the calculated principal component score as summarized data. The summarized data generated in this way is stored in the summarized data storage unit 33.

Next, the display unit 26 displays the current summarized data and the past summarized data combined with an event in a contrastable manner (S12). The display by the display unit 26 may be performed with an input via the user interface 105 as a trigger.

Here, an example of a method of combining the event and the summarized data will be described with reference to FIG. 4. First, an event is registered by the event registration unit 24 (S20). The event is registered as the worker inputs the contents of the event via the user interface 105. As for the registration of the event by the event registration unit 24, various assumed events may be registered in advance, or events may be registered at the timings when the events have occurred depending on the operating status of the plant. Additionally, an event may be registered in association with the good/bad information of the operating status of the plant. The data of the registered event is stored in the storage unit 30.

Next, the registered event and the summarized data are combined with each other by the data combining unit 25 (S21). Step S21 may be performed with an input by the worker via the user interface 105 as a trigger. For example, in a case where the summarized data is generated during the test run of the plant, the summarized data is stored in the summarized data storage unit 33 in association with the event "test run" (S22).

The past summarized data stored in the summarized data storage unit 33 is capable of being displayed by the display unit 26 together with the event combined with the past summarized data (S23), and is displayed together with the current summarized data (FIG. 3, S12).

Here, FIG. 5 is a diagram showing an example of the display mode of the display unit 26 in Step S12. A display region 40 in FIG. 5 is obtained by using the current summarized data (the current date is Dec. 3, 2018, in FIG. 5) summarized by the summarization unit 23 as target data, and displaying the contrast with the summarized data in a period from Jan. 1, 2018 to Dec. 2 of the same year that was past with respect to Dec. 3, 2018. The display region 40 includes a display region 50 that displays a coordinate system corresponding to the dimensionality of the summarized data summarized by the summarization unit 23, and display regions 70, 80, and 90 that display information related to the summarized data.

The display region 50 shows a coordinate system in which the first principal component 52 and the second principal component 54 are two-dimensional coordinate axes. In the coordinate system of the display region 50, a plurality of summarized data 60 are plotted depending on the principal component score of each principal component. The plurality of summarized data 60 includes current summarized data 62a and target summarized data 64 (in FIG. 5, other past summarized data other than the summarized data 62a and 64 are shown by dots). Additionally, any one of the plurality of summarized data 60 is associated with a predetermined event 56 and events 58a, 58b, and 58c. In this example, the event 56 including the target summarized data 64 is an event referred to as "test run", and the events 58a, 58b, and 58c are events referred to as "failed states" in which the causes of failure are different from each other. Additionally, the event 56 is an event in which the plant is recognized as being in a good state, and the events 58a, 58b, and 58c are events in which the plant is recognized as being in a deteriorated state.

In the display region 70, each information of the current summarized data 62a and the target summarized data 64 is displayed. In the display region 80, information on at least one past summarized data similar to the current summarized data 62a is displayed. The display region 90 displays information on at least one past summarized data dissimilar to the current summarized data 62a.

In the display region 70, the similarity ("70%" in the example of FIG. 5) of the current summarized data 62a to the target summarized data 64 is displayed. Additionally, in each of the display regions 80 and 90, past summarized data similar or dissimilar to the current summarized data 62a is displayed in a ranking format. Additionally, in common to the display regions 70 to 90, assist information for grasping the timing of the plant operation of the summarized data and the operating status of the plant is displayed. The assist information includes, for example, information related to an event associated with the summarized data, the operating status of the plant at that timing, the contents of an action executed at that timing, the result after the action is executed, or various process data that is the original data of the summarized data. The assist information may be used to assist in determining an action to be executed on the plant.

By visually recognizing the display region 40 as shown in FIG. 5, the worker determines whether the current summarized data 62a is similar to the targeted past summarized data 64 (S13). In the example of FIG. 5, since the targeted past summarized data 64 is associated with the event 56 referred to as "test run" in which the plant is recognized as in a good state, the worker operates the plant to bring the current summarized data 62a closer to the targeted past summarized data 64.

In the example shown in FIG. 5, the current summarized data 62a is displayed with a similarity of "70%" to the target summarized data 64. In a case where the worker who has visually recognized the display region 40 of the display unit 26 determines that the current summarized data 62a cannot be said to be similar to the target summarized data 64 (S13 NO), a predetermined action is executed on the plant with the input by the worker via the user interface 105 as a trigger (S14). In this case, for example, the predetermined action is executed on the plant in consideration of the assist information or the like displayed by the display unit 26. Specifically, in a case where the worker executes the predetermined action on the plant, the display region 80 in the display unit 26 is visually recognized, and assist information (for example, what kind of event is associated with, an executed action, the result thereof, and the like) at least one past summarized data having a high similarity to the current summarized data 62a can be considered.

After the action is executed, the process returns to Step S12 where the display unit 26 again displays the current summarized data and the past summarized data combined with the event in a contrastable manner (S12).

Here, FIG. 6 is a diagram showing an example of the display mode of the display unit 26 after the execution of the action on the plant in Step S14. In the display region 40 of FIG. 6, the current summarized data summarized by the summarization unit 23 is dated Dec. 4, 2018, which is the day after that in FIG. 5. Additionally, in the coordinate system of the display region 50, whether the current summarized data 62b has changed in any direction from the summarized data 62a on the previous day in the coordinate system is displayed, and how the positional relationship of the current summarized data 62b with respect to the targeted past summarized data 64 has changed is displayed in a contrastable manner. As a result of executing the action in Step S14, the current summarized data 62b is displayed as having a similarity "80%" with respect to the targeted past summarized data. Accordingly, since it can be seen that the targeted past summarized data has been approached, it can be recognized that the directionality of the action executed in Step S14 is correct. In this way, Steps S12 to S14 are repeated until it is determined that the current summarized data is similar to the targeted past summarized data.

In a case where the current summarized data is determined to be similar to the targeted past summarized data (good state) (S13 YES), the process ends.

As described above, in the assist device according to the present embodiment, the dimensionality of the process data is summarized by the summarization unit, and the summarized data summarized by the summarization unit is displayed on the display unit. According to this, since the summarized data in which the dimensionality of the process data is summarized is displayed, for example, as compared with a case in which multidimensional process data is displayed, the operating status of the plant can be easily grasped without imposing an excessive burden on the worker. Additionally, since the display is based on the summarized data, for example, even an unskilled person can grasp the operating status of the plant. Moreover, since the summarized data in which the dimensionality of the process data is summarized is handled, it is possible to assist in grasping the operating status of the plant with a simple configuration.

The present invention is not limited to the above embodiment and can be applied in various modifications. In the above embodiment, an example has been described in which the two-dimensionally summarized data including the first principal component and the second principal component are generated. However, the number of principal components is not limited to this and, for example, three-dimensionally summarized data including the first principal component, the second principal component, and a third principal component may be generated. In this case, a three-dimensional coordinate system is displayed in the display region 50 of FIGS. 5 and 6. In addition, the algorithm for summarizing dimensionality is not limited to the principal component analysis, and other statistical methods may be used.

Additionally, the operation of the assist device 10 is not limited to one in which the operation is all automated by the calculation processing of the computer but also includes one in which the manual work by the worker is interposed in at least a portion of the operation. Additionally, in the above embodiment, the display modes of FIGS. 5 and 6 by the display unit are merely examples, and are not limited thereto.

Additionally, the assist device 10 shown in the above embodiment may be a device separate from the plant or may be a device incorporated in the plant itself. In the case where the device incorporated into the plant itself, the plant includes a processing device that performs predetermined processing, and a control device that controls the processing device, and further includes the configuration of various functional blocks of the dimensionality summarization mechanism 20 and the storage unit 30 in the assist device 10 shown in the above embodiment.

The aspects of implementation described through the embodiment of the present invention can be used by appropriately combining, altering, or improving depending on applications, and the present invention is not limited to the description of the above-described embodiment. It is apparent from the description of the claims that forms to which such combinations, alterations, or improvements are added may also be included in the technical scope of the present invention.

It should be understood that the invention is not limited to the above-described embodiment, but may be modified into various forms on the basis of the spirit of the invention. Additionally, the modifications are included in the scope of the invention.

What is claimed is:

1. An assist device for grasping an operating status of a plant, the assist device comprising:
   a processing device configured to perform predetermined processing;
   a control device configured to control the processing device;
   a processor;
   a non-transitory computer storage medium comprising
      a data acquisition program configured to be executed by the processor to acquire process data from the control device and a sensor provided in the plant, and
      a summarization program configured to be executed by the processor to summarize dimensionality of the process data acquired by the data acquisition program; and
   a display configured to display summarized data summarized by the summarization program,
   wherein the display comprises
      a first display region that displays a plurality of the summarized data including current summarized data, target summarized data, and past summarized data combined with a registered event in a coordinate system with each principal component as a coordinate axis,
      a second display region that displays a degree of similarity of the current summarized data to the target summarized data and the past summarized data, and
      a third display region that displays the past summarized data similar or dissimilar to the current summarized data in a ranking format.

2. The assist device according to claim 1,
   wherein the non-transitory computer storage medium further comprises a rule generation program configured to be executed by the processor to generate a dimensionality summarization rule in which the dimensionality of the process data is summarized into a smaller number of dimensions than before the process data is summarized, and
   wherein the summarization program is further configured to be executed by the processor to summarize the dimensionality of the process data on the basis of the dimensionality summarization rule.

3. The assist device according to claim 1, further comprising:
   a storage configured to store the summarized data combined with the event by the processor,
   wherein the non-transitory computer storage medium further comprises
      an event registration program configured to be executed by the processor to register an event related to the plant, and
      a data combining program configured to be executed by the processor to combine the event registered by the event registration program with the summarized data summarized by the summarization program, and
   wherein the display displays the summarized data and the past summarized data combined with the event in a contrastable manner.

4. The assist device according to claim 3,
   wherein the event registration program is further configured to be executed by the processor to register the event in association with information about the operating status of the plant.

5. The assist device according to claim 1,
   wherein the display further displays a change in the summarized data when an action is executed on the plant.

6. The assist device according to claim 1,
   wherein the display displays a coordinate system corresponding to the dimensionality of the summarized data.

7. The assist device according to claim 1,
   wherein the process data is data indicating a change over time.

8. An assist method executed by an assist device comprising a processor for grasping an operating status of a plant, the assist method comprising:
   performing, by a processing device, predetermined processing;
   controlling, by a control device, the processing device;
   acquiring process data from the control device and a sensor provided in the plant by a data acquisition unit;
   summarizing dimensionality of the process data acquired by the data acquisition unit by a summarization unit; and
   displaying summarized data summarized by the summarization unit by a display which comprises a first display region that displays a plurality of the summarized data including current summarized data, target summarized data, and past summarized data combined with a registered event in a coordinate system with each principal component as a coordinate axis, a second display region that displays a degree of similarity of the current summarized data to the target summarized data and the past summarized data, and a third display region that displays the past summarized data similar or dissimilar to the current summarized data in a ranking format.

9. The assist method according to claim 8, further comprising:
displaying the summarized data and the past summarized data combined with the registered event related to the plant in a contrastable manner; and
displaying a change in the summarized data when an action is executed on the plant and the past summarized data in a contrastable manner.

10. A non-transitory computer storage medium storing an assist program to be executed by a computer to grasp an operating status of a plant,
the program causing the computer to execute
performing, by a processing device, predetermined processing;
controlling, by a control device, the processing device;
acquiring process data from the control device and a sensor provided in the plant;
summarizing dimensionality of the acquired process data; and
displaying a plurality of summarized data including current summarized data, target summarized data, and past summarized data combined with a registered event in a coordinate system with each principal component as a coordinate axis in a first display region, a degree of similarity of the current summarized data to the target summarized data and the past summarized data in a second display region, and the past summarized data similar or dissimilar to the current summarized data in a ranking format in a third display region.

11. A plant executed by an assist device comprising a processor, comprising:
a non-transitory computer storage medium comprising
a data acquisition program configured to be executed by the processor to acquire process data from a sensor provided in the plant, and
a summarization program configured to be executed by the processor to summarize dimensionality of the process data acquired by the data acquisition program;
a controller configured to control the plant; and
a display configured to display summarized data summarized by the summarization program,
wherein the display comprises
a first display region that displays a plurality of the summarized data including current summarized data, target summarized data, and past summarized data combined with a registered event in a coordinate system with each principal component as a coordinate axis,
a second display region that displays a degree of similarity of the current summarized data to the target summarized data and the past summarized data, and
a third display region that displays the past summarized data similar or dissimilar to the current summarized data in a ranking format.

* * * * *